United States Patent
Shin et al.

(10) Patent No.: US 12,164,886 B2
(45) Date of Patent: Dec. 10, 2024

(54) METHOD AND APPARATUS FOR GENERATING APPLICATIONS

(71) Applicant: SAMSUNG ELECTRONICS CO., LTD., Suwon-si (KR)

(72) Inventors: Donghun Shin, Suwon-si (KR); Daewung Kim, Suwon-si (KR); Byungkwon Kang, Suwon-si (KR); Hyunseok Cha, Suwon-si (KR); Youngah Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 17/964,781

(22) Filed: Oct. 12, 2022

(65) Prior Publication Data

US 2023/0195424 A1 Jun. 22, 2023

Related U.S. Application Data

(63) Continuation of application No. PCT/KR2022/014043, filed on Sep. 20, 2022.

(30) Foreign Application Priority Data

Dec. 22, 2021 (KR) .......................... 10-2021-0184512

(51) Int. Cl.
*G06F 8/20* (2018.01)
*G06F 3/0484* (2022.01)
(Continued)

(52) U.S. Cl.
CPC .............. *G06F 8/20* (2013.01); *G06F 3/0484* (2013.01)

(58) Field of Classification Search
CPC . G06F 8/20; G06F 3/0484; G06F 8/38; G06F 8/34
See application file for complete search history.

(56) References Cited

U.S. PATENT DOCUMENTS 6,687,745 B1 * 2/2004 Franco ................... H04L 67/025
709/219
7,502,838 B2 3/2009 Franco et al.
(Continued)

FOREIGN PATENT DOCUMENTS

| CN | 110764753 | 2/2020 |
| CN | 107783760 | 10/2020 |

(Continued)

OTHER PUBLICATIONS

Search Report and Written Opinion dated Jan. 5, 2023 issued in International Patent Application No. PCT/KR2022/014043.

*Primary Examiner* — Daxin Wu
(74) *Attorney, Agent, or Firm* — Nixon & Vanderhye, P.C.

(57) ABSTRACT

An embodiment of the present disclosure relate to a method for creating an application. The method for generating an application may comprise: identifying a component library including information on a plurality of visual logics, generating a first application based on information on a first visual logic corresponding to a first design and information on a business logic generated based on attributes of the application, identifying information on a second visual logic corresponding to a second design different from the first design, and generating a second application based on information on the second visual logic and information on the business logic. The information on the first visual logic and the information on the second visual logic may be included in the information on the plurality of visual logics.

16 Claims, 6 Drawing Sheets

(51) Int. Cl.
*G06F 8/34* (2018.01)
*G06F 8/38* (2018.01)

(56) References Cited

U.S. PATENT DOCUMENTS

| | | |
|---|---|---|
| 8,402,115 B2 | 3/2013 | Franco et al. |
| 8,626,829 B2 | 1/2014 | Franco et al. |
| 9,397,971 B2 | 7/2016 | Franco et al. |
| 9,807,200 B2 | 10/2017 | Franco et al. |
| 10,275,265 B1* | 4/2019 | Gould ............... G06F 3/04842 |
| 10,698,665 B2* | 6/2020 | Hwang .................. G06F 8/34 |
| 11,385,867 B1* | 7/2022 | Kirilov .................. G06F 8/34 |
| 2006/0059127 A1* | 3/2006 | Berry .................... G06F 8/38 |
| 2007/0192678 A1 | 8/2007 | Tang et al. |
| 2008/0244424 A1* | 10/2008 | Fukuda .................. G06F 8/34 |
| | | 715/763 |
| 2010/0313181 A1* | 12/2010 | Fernandez .............. G06F 8/20 |
| | | 717/109 |
| 2013/0039422 A1 | 2/2013 | Kirchhoffer et al. |
| 2017/0123641 A1* | 5/2017 | Lance .................... G06F 8/30 |
| 2017/0131975 A1* | 5/2017 | Balasubramanian ..... G06F 8/30 |
| 2019/0028360 A1* | 1/2019 | Douglas ................ H04L 41/22 |
| 2019/0250896 A1* | 8/2019 | Gudipati ................ G06F 8/54 |
| 2020/0019387 A1* | 1/2020 | Wang .................... G06F 8/38 |
| 2021/0150263 A1* | 5/2021 | Corwin ................ G06F 16/148 |
| 2021/0389933 A1* | 12/2021 | van Ijzendoorn ......... G06F 8/71 |
| 2022/0413843 A1* | 12/2022 | Agarwal ................. G06F 8/34 |

FOREIGN PATENT DOCUMENTS

| | | |
|---|---|---|
| CN | 110825362 | 4/2023 |
| CN | 112685024 | 11/2023 |
| EP | 1830254 | 9/2007 |
| JP | 2001-344105 | 12/2001 |
| JP | 2004-310279 | 11/2004 |
| JP | 2011-165209 | 8/2011 |
| KR | 10-1720158 | 3/2017 |
| KR | 10-2152136 | 8/2020 |
| KR | 10-2237877 | 4/2021 |

* cited by examiner

```
┌─ exported.cs ──────────────────────────────┐
│ Class ConfirmButton extends BaseButton {   │
│ ...                                        │  ⎫
│   render(){                                │  ⎬ 610
│     Rectangle(BorderRadius:0);             │  ⎪
│     TextLabel(Color:'#fffff',fontSize:14); │  ⎭
│   }                                        │
│ }                                          │
└────────────────────────────────────────────┘

┌─ exported.cs ──────────────────────────────┐
│ Class ConfirmButton extends BaseButton {   │
│ ...                                        │  ⎫
│   render(){                                │  ⎬ 610
│     Rectangle(BorderRadius:0);             │  ⎪
│     TextLabel(Color:'#fffff',fontSize:14); │  ⎭
│   }                                        │
│ onFocused(){...}                           │  } 620
│ }                                          │
└────────────────────────────────────────────┘

┌─ exported.cs ──────────────────────────────┐
│ Class ConfirmButton extends BaseButton {   │
│ ...                                        │  ⎫
│   render(){                                │  ⎬ 630
│     Rectangle(BorderRadius:16);            │  ⎪
│     TextLabel(Color:'#fffff',fontSize:14); │  ⎭
│   }                                        │
│ onFocused(){...}                           │  } 620
│ }                                          │
└────────────────────────────────────────────┘
```

METHOD AND APPARATUS FOR GENERATING APPLICATIONS

CROSS REFERENCE TO RELATED APPLICATIONS

This application is a continuation of International Application No. PCT/KR2022/014043 designating the United States, filed on Sep. 20, 2022, in the Korean Intellectual Property Receiving Office and claiming priority to Korean Patent Application No. 10-2021-0184512, filed on Dec. 22, 2021, in the Korean Intellectual Property Office, the disclosures of which are incorporated by reference herein in their entireties.

BACKGROUND

Field

The present disclosure relates to a method and an apparatus for generating applications.

Description of Related Art

A low-code development platform is an application providing the effect that can provide a graphic user interface (GUI) for programming to allow app developers to develop codes at a high speed and reduce the amount of work required for conventional programming in the past. This low-code tool may help in developing the codes faster by minimizing/reducing manual coding work. When such a low-code development tool is used, one does not have to write the code line by line and the code may be generated according to a written sequence diagram, so it may be very helpful in an application development process.

In this context, in the application development, these low-code tools may make it possible to perform extraction of development code by inputting a design result for visual elements of the application. The extracted result may be built into an application that can interact with a user through the app developer's little code writing. Therefore, the low-code aims to increase productivity by writing the codes based on the code automatically extracted from the design result.

For the low-code tools, the business logic may be initialized when the visual logic is modified after the business logic is modified, so may be necessary to rework the business logic according to the modification of the visual logic. Therefore, there has been a problem that may require additional work in updating the design elements of the application.

SUMMARY

Embodiments of the disclosure provide a method for minimizing and/or reducing the modification of business logic that may be required according to the modification of the visual logic and an electronic device therefor.

Embodiments of the disclosure provide a method for minimizing and/or reducing handoff between developments of the visual logic and the business logic through generation of a component library defined in a function unit, and an electronic device therefor.

According to an example embodiment, a method for generating an application may comprise: identifying a component library including information on a plurality of visual logics; generating a first application based on information on a first visual logic corresponding to a first design and information on a business logic generated based on attributes of the application; identifying information on a second visual logic corresponding to a second design different from the first design; and generating a second application based on information on the second visual logic and information on the business logic, wherein the information on the first visual logic and the information on the second visual logic may be included in information on the plurality of visual logics.

According to an example embodiment a non-transitory computer-readable recording medium storing therein computer readable instructions is provided, the instructions, when executed by at least one processor of an electronic device, may cause the electronic device to perform operations comprising: identifying a component library including information on a plurality of visual logics; generating a first application based on information on a first visual logic corresponding to a first design and information on a business logic generated based on attributes of the application; identifying information on a second visual logic corresponding to a second design different from the first design; and generating a second application based on information on the second visual logic and information on the business logic, wherein the information on the first visual logic and the information on the second visual logic may be included in information on the plurality of visual logics.

The method and apparatus for generating an application according to various example embodiments of the present disclosure may provide the effect of facilitating the update of design elements configuring the application, by automating the creation of visual codes while preventing and/or reducing the previously written source from being initialized according to the design modification.

Further, the method and apparatus for generating an application according to various example embodiments of the present disclosure may provide the effect of enabling the fast iteration by allowing the conformity to be checked immediately after a design update.

The effects that can be obtained from the present disclosure are not limited to those described above, and any other effects not specifically mentioned herein will be clearly understood by those having ordinary knowledge in the technical field to which the present disclosure belongs from the description below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, with reference to the drawings, various example embodiments of the present disclosure will be described in greater detail. However, the present disclosure may be implemented in several different forms and is not limited to the embodiments described herein. In connection with the description of the drawings, like or similar reference numerals may be used for like or similar components. Further, in the drawings and their related descriptions, descriptions of well-known functions and configurations may be omitted for clarity and conciseness.

Figure 1:
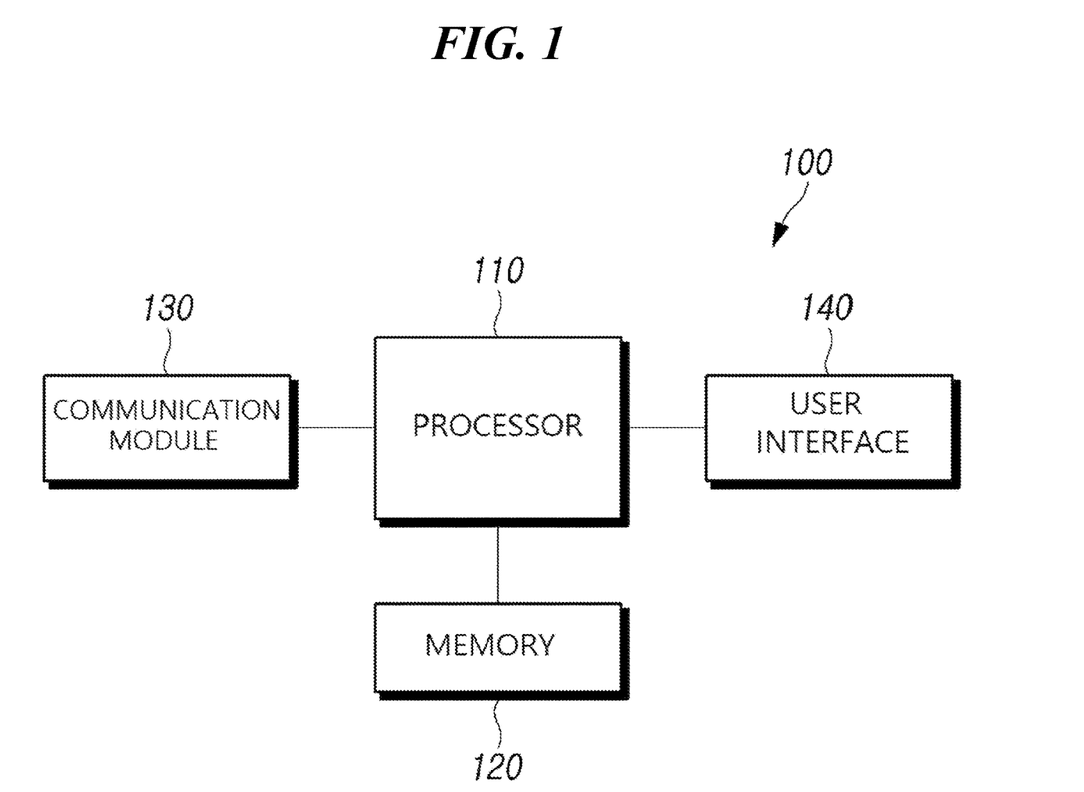
FIG. 1 is a block diagram illustrating an example configuration of an electronic device according to an embodiment.

FIG. 1 is a block illustrating an example configuration of an electronic device 100 according to an embodiment.

Referring to FIG. 1, an electronic device 100 may include a processor (e.g., including processing circuitry) 110, a memory 120, a communication module (e.g., including communication circuitry) 130, and a user interface 140.

In an embodiment, the processor 110 may include various processing circuitry and execute software (e.g., an application) to control at least one other component (e.g., a hardware or software component) of the electronic device 100 connected to the processor 110, and perform various data processing or operations. In an embodiment, as at least part of the data processing or operation, the processor may store instructions or data received from other components (e.g., the user interface 140) in the memory 120, process the stored instructions or data and store the result data in the memory 120. In an embodiment, the processor 110 may include a main processor (e.g., a central processing unit or an application processor) or an auxiliary processor (e.g., a graphic processing unit, a neural processing unit (NPU)) that may be operated independently or in a combination thereof. In an embodiment, the auxiliary processor (not shown) (e.g., NPU) may include a hardware structure specialized in processing an artificial intelligence model. The artificial intelligence model may be created based on machine learning. Such machine learning may be performed, for example, in the electronic device 100 itself on which the artificial intelligence model is performed, or may be performed via a separate server.

In an embodiment, the memory 130 may store various data used by at least one component (e.g., the processor 110) of the electronic device 100. The data may include, for example, input data or output data for the software (e.g., an application) and its related instructions. The memory may include a volatile memory or a non-volatile memory. The application may be stored as a software in the memory 120 and may include, for example, an operating system, a middleware, or an application.

In an embodiment, the communication module 130 may include various communication circuitry and support establishing a direct (e.g., wired) communication channel or a wireless communication channel between the electronic device 100 and an external electronic device (e.g., another electronic device or server), and performing communications via the established communication channel. The communication module 130 may include one or more communication processors that operate independently of the processor 110 and support the direct communication or the wireless communication. In an embodiment, the communication module 130 may include a wireless communication module (e.g., a cellular communication module), a short-range communication module, or a wired communication module (e.g., a local area network (LAN) communication module).

In an embodiment, the user interface 140 may include various circuitry including, for example, an input part for receiving an input received from a user, and an output part for outputting data output via the processor 110 and the memory 120.

In an embodiment, the memory 120 may store a component library including information on a plurality of visual logics.

In an embodiment, the memory 120 may store instructions that enable the processor 110 to identify the visual logic or the business logic identified according to a user's input.

In an embodiment, the memory 120 may store instructions for causing the processor 110 to extract a component code corresponding to the visual logic and the business logic.

In an embodiment, the memory 120 may store instructions that cause the processor 110 to generate an application based on the visual logic and the business logic.

Figure 2:
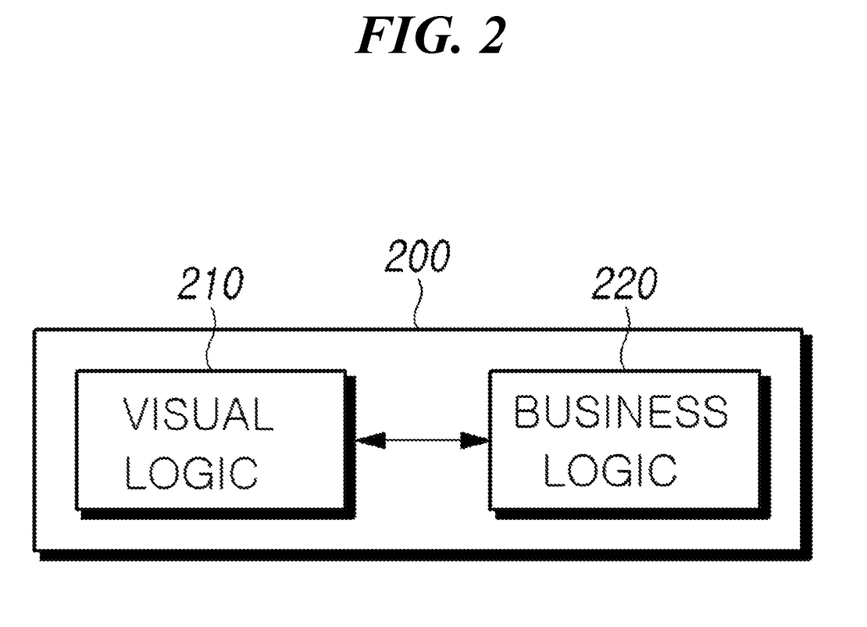
FIG. 2 is a block diagram illustrating example components of an application according to an embodiment.

FIG. 2 is a block diagram illustrating an example configuration of an application 200 according to an embodiment.

Referring to FIG. 2, the application 200 may refer to a program designed to directly perform a specific function for the user or another application program, as an application program. An example of applications may include a database program, a web browser, a development tool, or the like.

According to an embodiment, the application 200 may include a visual logic 210 and a business logic 220.

In an embodiment, the visual logic 210 may refer to logic that implements an area viewed on a user screen in an application. For example, it may refer to logic that implements a visually expressed portion such as e.g., position, size, color, or round value of a view component of a user interface in an application.

In an embodiment, the business logic 220 may refer to logic that implements an area that is not viewed on the screen. For example, it may include logic for processing an exchange of information between the database and the user interface or performing a data processing, such as changing a screen for each condition or the like. The business logic 220 may include logic for enabling various modules (e.g., a network module, a database module, a page router, and a data model) of the electronic device 100 to perform their functions.

In development of an application, using the conventional low-code tools may lead to a problem that the business logic is initialized in case the design is modified after modifying the business logic. This is because the visual logic part and business logic part are extracted without being separated from each other, since the code generated upon extracting the code is a code generated by encoding a basic component of the design tool. To address the above-described problem, the present disclosure may apply a scheme of defining an abstracted component in a unit of function and operating in sharing an abstracted module in implementation with the design tool, so that it is possible to provide the effect capable of updating only the visual logic part even if the code is extracted after a design change and maintaining the previously implemented business logic as it is.

The method of generating an application according to an embodiment can generate codes in various languages through a scheme of extracting essential data encoded from a design result and generating a code from the extracted metadata.

According to the method of generating an application according to an embodiment, it is possible to separate the visual logic and the business logic, using a scheme of sharing a component defined as a unit of function at a higher level between the visual logic part and the business logic part, without encoding by mapping the basic tool provided by the design tool to the lowest rendering component of a business area, and converting the design element of an abstracted object unit into an abstracted object of a code area to extract the code. Accordingly, even if the design source is updated, it is possible to maintain the connectivity with the code of the previously written business logic.

Figure 3:
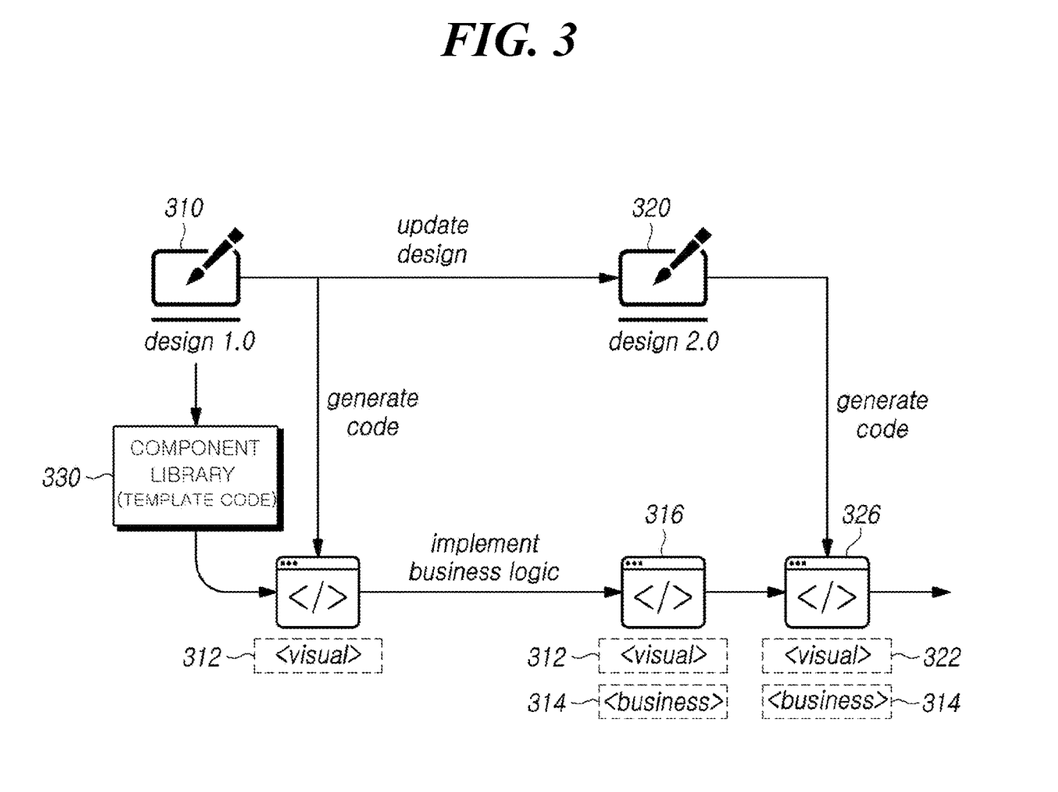
FIG. 3 is a diagram illustrating an example of application generation according to an embodiment.

FIG. 3 is a diagram illustrating an example of application generation according to an embodiment.

The application generation of FIG. 3 may include an operation of the electronic device 100 for generating an application. The application shown in FIG. 3 may include the application 200 of FIG. 2. The visual logic (e.g., 312 and 322) shown in FIG. 3 may be included in the visual logic 210 of FIG. 2. The business logic (e.g., 314) shown in FIG. 3 may be included in the business logic 220 of FIG. 2.

In the following description, a first design 310 may refer, for example, to an existing design before it is updated, and a second design 320 may refer, for example, to a design updated from the first design 310. The first visual logic (e.g., the visual logic 312) may refer, for example, to the visual logic included in the first design 310, and the first business logic (e.g., the business logic 314) may refer, for example, to the visual logic included in the first design 310. The second visual logic (e.g., visual logic 322) may refer, for example to the visual logic included in the second design 320, and the second business logic (not shown) may refer, for example, to the business logic included in the second design 320.

Conventionally, when the visual logic is modified according to the update of the design, there existed a problem that the first business logic (e.g., the business logic 314) of the existing design is initialized. In other words, there was a need for a second business logic to be generated such that the first business logic is initialized and corresponds to the newly created second visual logic. The electronic device according to an embodiment may define a component library (e.g., the component library 330) abstracted in a unit of function so that the first business logic can also be used in the second design.

In an embodiment, the electronic device 100 may include the component library 330 defined according to the unit of functions configuring a design area and/or a development area for performing an application. For example, the memory 120 may store the component library 330. The component library 330 may include information on component attribute values and component code templates. The component library 330 may be defined and managed in the design area (e.g., the visual logic 210) of the application 200, and a template of the component code may be defined according to the definition of the design.

Referring to FIG. 3, when the design is updated to the second design 320 after the electronic device 100 generates the first application including the first design 310, a process of creating a second application including the second design 320 is shown.

In an embodiment, the electronic device 100 may generate the first application 316. For example, the electronic device 100 may identify the first design 310, generate the visual logic 312 based thereon, and then apply the business logic 314 to the visual logic 312, thereby generating the first application 316. The business logic 314 may be logic including information necessary for execution of an application, which may be stored in the component library 330 separately from the visual logic 312.

In an embodiment, the first design 310 may include a design corresponding to a unit of function defined in the component library 330. The first design 310 may correspond to a component attribute value and a component code template included in the component library 330.

In an embodiment, the electronic device 100 may generate the visual logic 312 based on the component library 330. For example, the electronic device 100 may generate the visual logic 312, by extracting screen configuration information and component attribute values from the result of the first design.

In an embodiment, as the design is updated from the first design 310 to the second design 320, the electronic device 100 may generate the second application 326 including the second design 320. For example, the electronic device 100 may identify the second design 320 in which all or part of the design included in the first design 310 is modified.

In an embodiment, the second design 320 may include a design corresponding to the unit of function defined in the component library 330. For example, the second design 320 may correspond to a component attribute value and a component code template included in the component library 330.

In an embodiment, the electronic device 100 may generate the visual logic 322 based on the component library 330. For example, the electronic device 100 may generate the visual logic 322, by extracting screen configuration information and component attribute values from the result of the second design.

In an embodiment, the electronic device 100 may identify the second design 310, generate the visual logic 322 based thereon, and then apply the business logic 314 to the visual logic 322, thereby generating the second application 326. The business logic 314 may include the business logic included in the first application 316.

As described above, by updating the design to correspond to the component library defined in a unit of function, the existing business logic may be applied as it is despite the change in the visual logic based on the update of the design.

Figure 4:
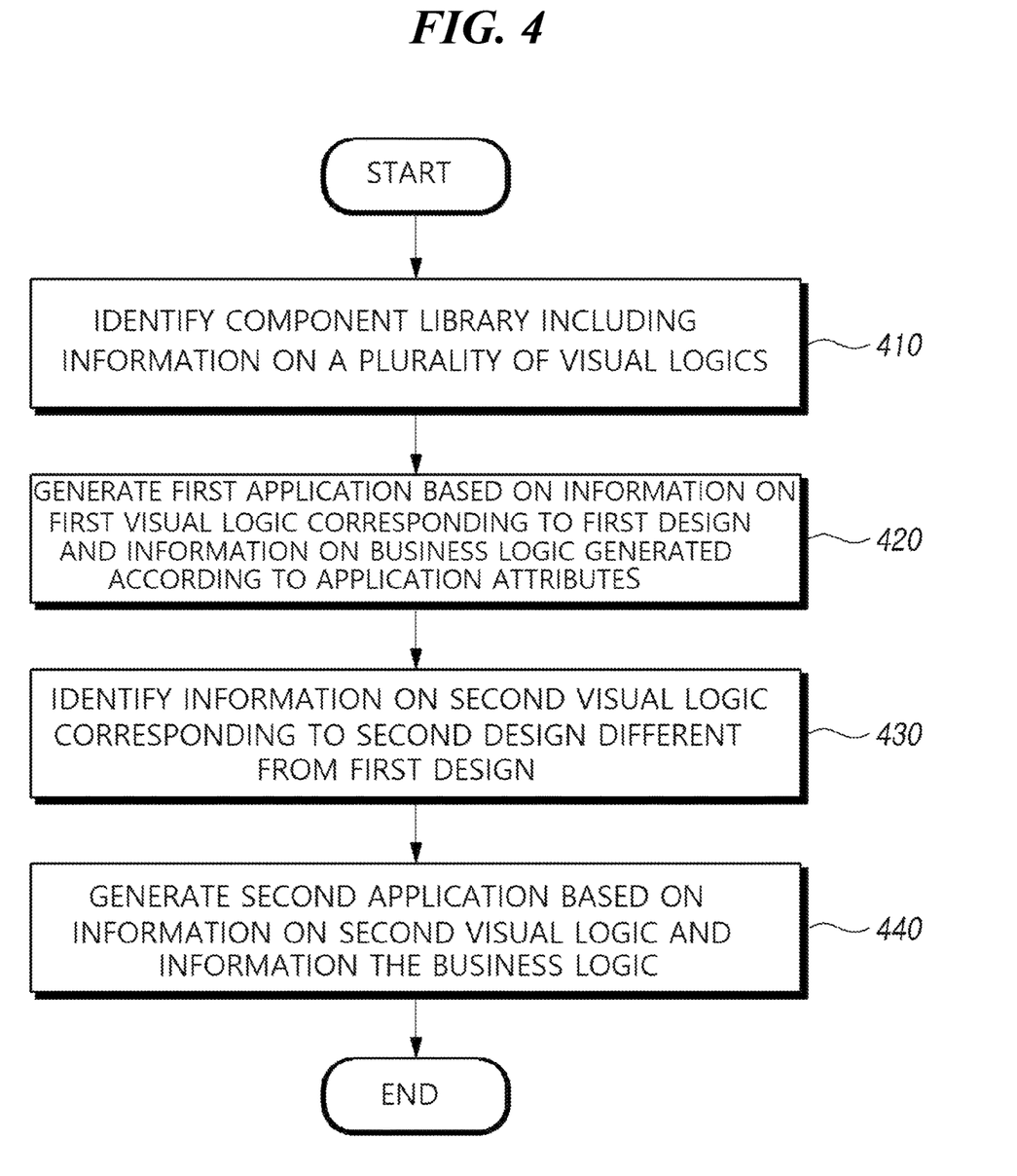
FIG. 4 is a flowchart illustrating an example of application generation according to an embodiment.

FIG. 4 is a flowchart illustrating an example operation of the electronic device 100 according to an embodiment.

According to an embodiment, in operation 410, the electronic device may identify a component library including information on a plurality of visual logics. The visual logic may include logic used to implement design elements included in the application.

In an embodiment, the component library may include information on a design element included in an application and information on visual logic corresponding to each design element.

In an embodiment, the information on the design elements may include information on components configuring a graphic user interface (GUI) included in the application. For example, the components configuring the GUI may include information on objects displayed through the application (e.g., icons, buttons, and selection windows for receiving a user input), types and sizes of displayed fonts, arrangement of components, screen layout (e.g., width and height, aspect ratio, etc.)

In an embodiment, the component library may be defined and managed in the design area of configuration of the application, and the component code template may be generated according to the definition of the design.

In an embodiment, the information on the plurality of visual logics may include information on the component attribute and the component code template of each of the plurality of visual logics. For example, the component attribute may include information on e.g., shape, layout, color, zooming-in/out, whether the shape is changed through interaction with the user (e.g., whether the effect of the button being pressed is applied when a button is selected, or whether the position can be moved (e.g., whether the position of the displayed object is fixed). The component code template may include information related to a code applied when implementing it through an application according to the component attributes.

According to an embodiment, in operation 420, the electronic device may generate the first application based on the information on the first visual logic corresponding to the first design and the information on the business logic generated according to the application attributes.

In an embodiment, the information on the first visual logic may include information on the logic used to implement design elements included in the first design.

In an embodiment, the information on the first visual logic may be identified based on information on a plurality of visual logics included in the component library.

In an embodiment, the information on the business logic may be generated according to the attribute of an application to be generated by the electronic device. The business logic may be information generated independently of the visual logic, and include an algorithm to perform the data processing, such as e.g., an algorithm handling information exchange between a database and a user interface stored in the electronic device or an external server, and a screen switching for each condition. For example, the information on business logic may include an algorithm for performing the data processing in between a communication module (e.g., the communication module 130), a memory (e.g., the memory 120), a page conversion module (not shown), a data module (not shown) and the user interfaces 140.

In an embodiment, the information on the business logic may be stored in the component library separately from the visual logic.

According to an embodiment, in operation 430, the electronic device may identify information on the second visual logic corresponding to the second design different from the first design. The second visual logic may include information determined according to the second design. The second design may include a design in which at least one element among the elements configuring the first design is modified. For example, among the elements configuring the first design, the second design may be identified in which a shape of an object displayed on the application to perform a predefined specific function (e.g., a "Confirm" button displayed on the application to identify a user's confirmation input) is modified (e.g., with its corner being modified from an angle shape to a rounded shape).

In an embodiment, the electronic device may identify the second visual logic based on information on a plurality of visual logics included in the component library.

According to an embodiment, in operation 440, the electronic device may generate a second application based on the information on the second visual logic and the information on the business logic.

In an embodiment, the information on the business logic may include information corresponding to the business logic used to generate the first application in operation 420.

In an embodiment, when identifying the modification of the business logic after operation 440, the electronic device may generate a third application based on information on the modified business logic and information on the second visual logic. For example, when a part of the business logic is modified to improve the function of the second application, the second application may be generated based on the modified business logic and the second visual logic included in the second application.

In an embodiment, the information on the first visual logic and the information on the second visual logic may include information on any one visual logic of the information on the plurality of visual logics.

Figure 5:
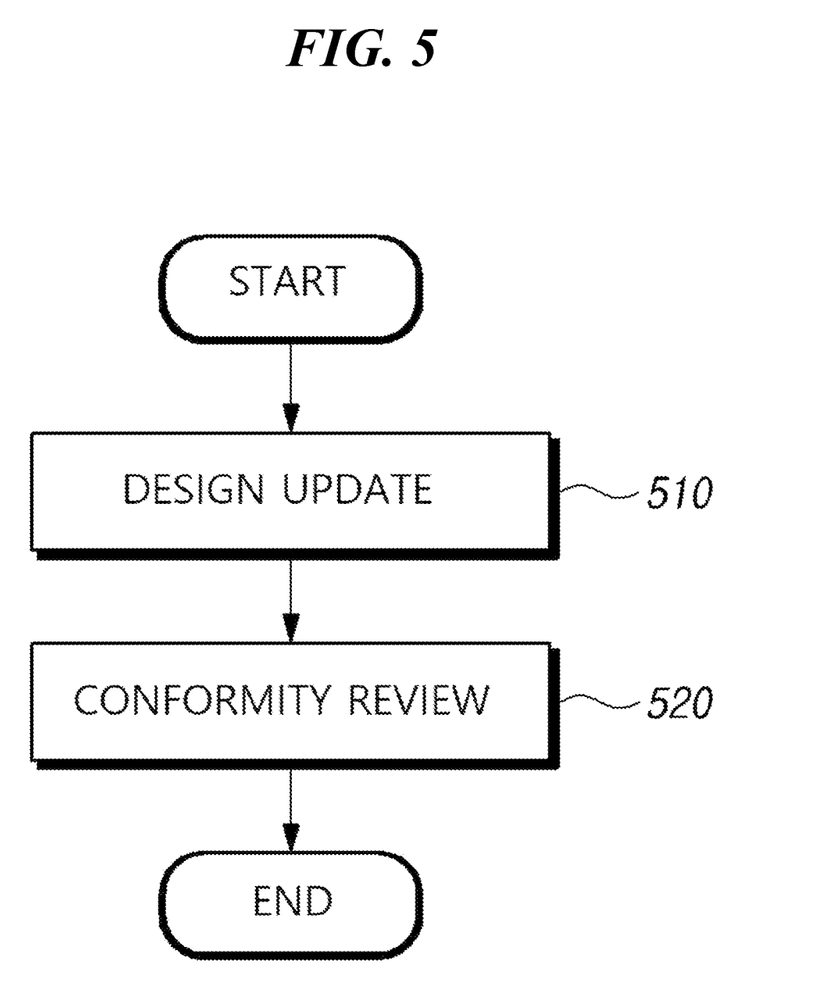
FIG. 5 is a flowchart illustrating an example of a conformity review process of an application according to an embodiment.

FIG. 5 is a flowchart illustrating an example operation of conformity review of an application according to an embodiment. In the following description, the conformity may refer, for example, to comparing a certain design with a result actually implemented based on the design.

According to an embodiment, in operation 510, the electronic device may identify a design update. The design update operation according to operation 510 may include operations corresponding to the operations 410 to 440 of the electronic device of FIG. 4.

According to an embodiment, in operation 520, the electronic device may perform a conformity review of the updated design.

In relation to generation of an application, the conformity review could be performed after the developer implemented the code for an existing design result to generate and execute the actual application, but the conformity can be reviewed checked immediately after the design update of the application without the developer's separate code implementation process, by automating the operation of generating a component library defined in advance for each function and implementing the visual logic based thereon. Accordingly, it is possible to prevent and/or reduce the problem that errors may occur when an application developer writes a design guide, and the application is implemented based on the guide. Further, when the electronic device responds to screens of various form factors, all screen ratios can be visually checked, thereby providing an effect of resolving possible errors in advance.

Figure 6:
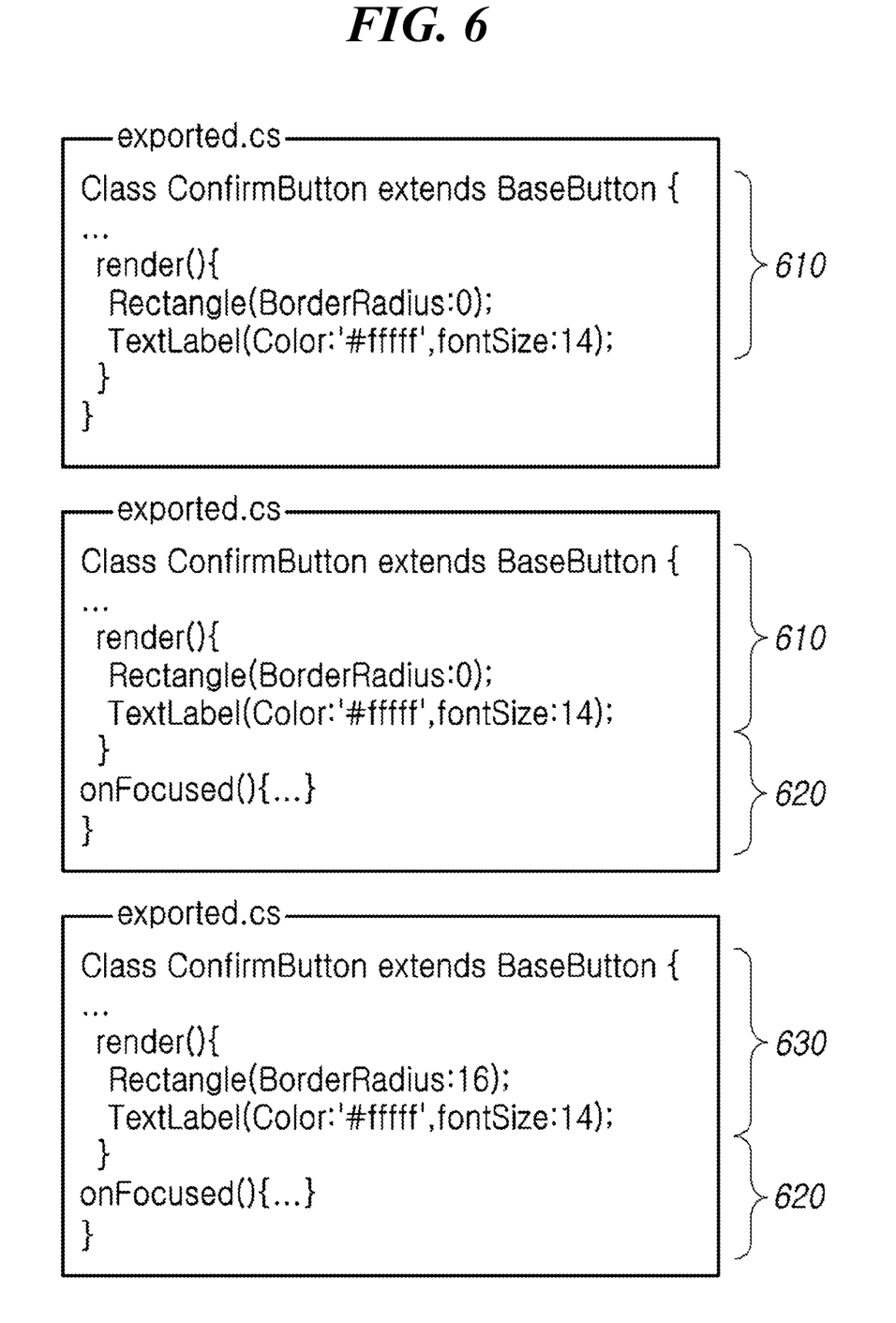
FIG. 6 is a diagram illustrating an example of application generation according to an embodiment.

FIG. 6 is a diagram illustrating an example of application generation according to an embodiment.

Referring to FIG. 6, an example of the visual logic and the business logic implemented when an application is generated is disclosed. Referring to FIG. 6, the application may include a first visual logic 610, a second visual logic 630, and a business logic 620.

In an embodiment, a first application may be generated based on the first visual logic 610 and the business logic 620.

In an embodiment, the first visual logic 610 may include information on a design element (e.g., a Confirm button) of the application. For example, the first visual logic may include information on a shape (e.g., a rectangle) of a design element, information on a form factor (e.g., an angle corner (borderradious: 0)), and information on a displayed font (e.g., color, font, size, etc.).

In an embodiment, the business logic 620 may include information necessary to perform a function of an application.

In an embodiment, the second application may be generated based on the second visual logic 620 in which the form factor of the design element is modified in the first visual logic 610 (e.g., borderradious being changed from 0 to 16), and the business logic 620 used in the first application.

In an embodiment, although not shown in the drawing, when the business logic 620 is modified, a third application different from the first application and the second application may be generated based on the modified business logic and the second visual logic 630.

In an embodiment, although not shown in the figure, a fourth application different from the first application, the second application and the third application can be generated, based on the modified business logic and the third visual logic modified in the second visual logic.

The developer's app development can be easily performed by generating the visual logic and the business logic configuring the application based on the component library defined in the unit of function.

A method for generating an application according to an example embodiment of the present disclosure may comprise: identifying a component library including information on a plurality of visual logics; generating a first application based on information on a first visual logic corresponding to a first design and information on a business logic generated based on attributes of the application; identifying information on a second visual logic corresponding to a second design different from the first design; and generating a second application based on information on the second visual logic and information on the business logic, wherein the information on the first visual logic and the information on the second visual logic may be included in information on the plurality of visual logics In an example embodiment, the application may comprise an application configured to generate an application through a low-code tool.

In an example embodiment, the method for generating an application may comprise: extracting screen configuration information of the first design and a component attribute value of the first design; generating information on the first visual logic based on the screen configuration information of the first design and the component attribute value of the first design; extracting screen configuration information of the second design and a component attribute value of the second design; and generating information on the second visual logic based on the screen configuration information of the second design and the component attribute value of the second design.

In an example embodiment, the information on the first visual logic may include information on a code extracted based on the component attribute of the first design, and the information on the second visual logic may include information on a code extracted based on the component attribute of the second design.

In an example embodiment, the information on the plurality of visual logics may include information on a design element of the application, and the design element of the application may include information on a shape of an object included in the application and information related to a layout of a screen displayed through the application.

In an example embodiment, the component library may include information related to business logic related to a change in shape of the design element.

In an example embodiment, the method for generating an application may further comprise determining whether the information on the second visual logic corresponds to the information on the plurality of visual logics of the component library.

In an example embodiment, the method for generating an application may include determining that a similarity between the second design and information on the plurality of visual logics is equal to or greater than a specified value.

In an example embodiment, the method for generating an application may comprise: identifying whether the second application and the second design correspond to each other; and generating the application based on determining that the second application and the second design correspond to each other.

In an example embodiment, the method may further comprise: identifying another business logic different from the business logic, and generating a third application based on the second visual logic and the other business logic.

A non-transitory computer-readable recording medium storing therein computer readable instructions according to an example embodiment of the present disclosure, the instructions may, when executed by at least one processor of an electronic device, cause the at least one processor to perform operations comprising: identifying a component library including information on a plurality of visual logics; generating a first application based on information on a first visual logic corresponding to a first design and information on a business logic generated based on attributes of the application; identifying information on a second visual logic corresponding to a second design different from the first design; and generating a second application based on information on the second visual logic and information on the business logic, wherein the information on the first visual logic and the information on the second visual logic may be included in information on the plurality of visual logics.

In an example embodiment, the application may include an application configured to generate an application via a low-code tool.

In an example embodiment, the recording medium may include instructions stored thereon that, when executed, cause an electronic device to further perform operations comprising: extracting screen configuration information of the first design and a component attribute value of the first design, generating information on the first visual logic based on the screen configuration information of the first design and the component attribute value of the first design, extracting screen configuration information of the second design and a component attribute value of the second design, and generating information on the second visual logic based on the screen configuration information of the second design and the component attribute value of the second design.

In an example embodiment, the information on the first visual logic may comprise information on a code extracted based on the component attribute of the first design, and the information on the second visual logic may comprise information on a code extracted based on the component attribute of the second design.

In an example embodiment, the information on the plurality of visual logics may comprise information on a design element of the application, and the design element of the application may comprise information on a shape of an object included in the application, and information related to a layout of a screen displayed through the application.

In an example embodiment, the component library may comprise information related to business logic related to a change in shape of the design element.

In an example embodiment, the recording medium may further include instructions stored thereon that, when executed, cause an electronic device to further perform an operation of determining whether the information on the second visual logic corresponds to the information on the plurality of visual logics of the component library.

In an example embodiment, the recording medium may further include instructions stored thereon that, when executed, cause an electronic device to further perform an operation of determining that a similarity between the second design and the information on the plurality of visual logics is equal to or greater than a specified value.

In an example embodiment, the recording medium may further include instructions stored thereon that, when executed, cause an electronic device to further perform operations of: identifying whether the second application and the second design correspond to each other and generating the application based on determining that the second application and the second design correspond to each other.

In an example embodiment, the recording medium may further including instructions stored thereon that, when executed, cause an electronic device to perform operations comprising: identifying the business logic and other business logic, and generating a third application based on the second visual logic and the other business logic.

The an embodiment and terms used herein are not intended to limit the technical features described herein to specific embodiments and should be understood to include various modifications, equivalents, or substitutes of the embodiment. For example, an element expressed in a singular should be understood as a concept including a plurality of elements unless the context clearly refers only the singular. It should be understood that the term 'and/or' as used herein is intended to encompass any and all possible combinations of one or more of the enumerated items. As used in the present disclosure, the terms such as 'comprise(s)', 'include(s)' 'have/has', 'configured of', etc. are only intended to designate that the features, components, parts, or combinations thereof described in the present disclosure exist, and the use of these terms is not intended to exclude the possibility of the presence or addition of one or more other features, components, parts, or combinations thereof. In this disclosure, each of the phrases such as "A or B", "at least one of A and B", "at least one of A, B and C", "at least one of A, B, or C", and "at least one of A, B, or C" may include any one of the phrases together, or all possible combinations thereof. Terms such as "the first", "the second", or "first", or "second" may be used simply to distinguish a corresponding component from another corresponding component, and do not limit the corresponding components in view of other aspect (e.g., importance or order).

The term "module" or "unit" used in an embodiment of the present disclosure may include a unit implemented in hardware, software, or firmware, or any combination thereof, and be used interchangeably with terms such as e.g., logic, logic block, component, or circuitry, for example. The module or unit may be a minimum unit or a part of the integrally configured component or the component that performs one or more functions. For example, according to an embodiment, the module or unit may be implemented in the form of an application-specific integrated circuit (ASIC).

The program executed by the display device described through this disclosure may be implemented as a hardware component, a software component, and/or a combination of the hardware component and the software component. The program may be executed by any system capable of executing computer readable instructions.

Software may include a computer program, code, instructions, or a combination of one or more of these, and independently or in combination (collectively) can command the processing unit. The software may be implemented as a computer program including instructions stored in a computer-readable storage medium. The computer-readable storage medium may include, for example, a magnetic storage medium (e.g., read-only memory (ROM), random-access memory (RAM), floppy disk, hard disk, etc.), an optically readable medium (e.g., CD-ROM, digital versatile disc (DVD), etc.) and so on. The computer-readable storage medium may be distributed among network-connected computer systems, so that the computer-readable code can be stored and executed in a distributed manner. The computer program may be distributed (e.g., downloaded or uploaded) by online, either via an application store (e.g. Play Store™) or directly between two user devices (e.g., smartphones). In the case of online distribution, at least a part of the computer program product may be temporarily stored or temporarily generated in a machine-readable storage medium such as a memory of a server of a manufacturer, a server of an application store, or a relay server.

According to an embodiment, each component (e.g., module or program) of the above-described components may include a singular or a plurality of entities, and some of the plurality of entities may be separated and placed into other components. According to an embodiment, one or more components or operations among the above-described corresponding components may be omitted, or one or more other components or operations may be added thereto. Alternatively or additionally, a plurality of components (e.g., a module or a program) may be integrated into one component. In this case, the integrated component may perform one or more functions of each component of the plurality of components identically or similarly to those performed by the corresponding component among the plurality of components prior to the integration. According to an embodiment, operations performed by a module, program, or other component may be executed sequentially, in parallel, repeatedly or heuristically, or one or more of the operations may be executed in a different order or omitted, or one or more other operations may be added thereto.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for generating an application, comprising:
identifying a component library abstracted according to a unit of functions for configuring an application, the component library including information on a plurality of application design elements and information on a plurality of visual logics, the information on the plurality of application design elements including information on respective components for configuring a graphical user interface (GUI) and the information on the plurality of visual logics including a component attribute and a component code template for each of the visual logics;
identifying a first application design corresponding to a unit of function defined in the component library;
generating information on a first visual logic using the component library based on the first application design, the information on the first visual logic including code extracted from the component library based on the component attribute of the first application design;

generating a first application by applying information on a business logic for implementing application functions to the information on the first visual logic;

identifying a second application design, different from the first application design, corresponding to the unit of function defined in the component library;

generating information on a second visual logic using the component library based on the second application design, the information on the second visual logic including code extracted from the component library based on the component attribute of the second application design; and generating a second application by applying to the information on the second visual logic the information on the same business logic on which the generating of the first application is based.

2. The method of claim 1, wherein the first application comprises an application configured to generate an application through a low-code tool.

3. The method of claim 1, wherein:
the application design elements comprise information on a shape of an application object and information related to application screen layout.

4. The method of claim 3, wherein the component library comprises information related to business logic related to a change in shape of the design element.

5. The method of claim 1, further comprising determining whether the information on the second visual logic corresponds to the information on the plurality of visual logics of the component library.

6. The method of claim 5, wherein the determining whether the information on the second visual logic corresponds to the information on the plurality of visual logics of the component library comprises determining that a similarity between the second application design and the information on the plurality of visual logics is equal to or greater than a specified value.

7. The method of claim 1, further comprising:
identifying whether the second application and the second application design correspond to each other; and
generating the second application based on determining that the second application and the second application design correspond to each other.

8. The method of claim 1, further comprising:
identifying another business logic different from the business logic; and
generating a third application based on the second visual logic and the other business logic.

9. A non-transitory computer-readable recording medium having stored thereon computer readable instructions, wherein the instructions, when executed by at least one processor of an electronic device, cause the electronic device to perform operations comprising:
identifying a component library abstracted according to a unit of functions for configuring an application, the component library including information on a plurality of application design elements and information on a plurality of visual logics, the information on the plurality of application design elements including information on respective components for configuring a graphical user interface (GUI) and the information on the plurality of visual logics including a component attribute and a component code template for each of the visual logics;
identifying a first application design corresponding to a unit of function defined in the component library;

generating information on a first visual logic using the component library based on the first application design, the information on the first visual logic including code extracted from the component library based on the component attribute of the first application design;

generating a first application by applying information on a business logic for implementing application functions to the information on the first visual logic;

identifying a second application design, different from the first application design, corresponding to the unit of function defined in the component library;

generating information on a second visual logic using the component library based on the second application design, the information on the second visual logic including code extracted from the component library based on the component attribute of the second application design; and generating a second application by applying to the information on the second visual logic the information on the same business logic on which the generating of the first application is based.

10. The non-transitory computer-readable recording medium of claim 9, wherein the first application comprises an application configured to generate an application via a low-code tool.

11. The non-transitory computer-readable recording medium of claim 9, wherein:
the application design elements comprise information on a shape of an application object and information related to an application screen layout.

12. The non-transitory computer-readable recording medium of claim 11, wherein the component library comprises information related to business logic related to a change in shape of the design element.

13. The non-transitory computer-readable recording medium of claim 9, further comprising instructions which, when executed, cause an electronic device to perform operations including determining whether the information on the second visual logic corresponds to the information on the plurality of visual logics of the component library.

14. The non-transitory computer-readable recording medium of claim 13, wherein the determining whether the information on the second visual logic corresponds to the information on the plurality of visual logics of the component library comprises determining that a similarity between the second application design and the information on the plurality of visual logics is equal to or greater than a specified value.

15. The recording medium of claim 9, wherein the recording medium includes instructions that, when executed, cause the electronic device to perform operations comprising:
identifying whether the second application and the second application design correspond to each other; and
generating the second application based on determining that the second application and the second application design correspond to each other.

16. The non-transitory computer-readable recording medium of claim 9, further comprising instructions that, when executed, cause the electronic device to perform operations comprising:
identifying the business logic and other business logic; and
generating a third application based on the second visual logic and the other business logic.

* * * * *